(12) United States Patent
Holtz et al.

(10) Patent No.: US 10,924,148 B2
(45) Date of Patent: Feb. 16, 2021

(54) BUMPERBAND AND CLAMSHELL ASSEMBLY FOR PROTECTING A CELL PHONE SUBHOUSING

(71) Applicant: Greenmo, Inc., Takoma Park, MD (US)

(72) Inventors: Neal Edward Holtz, Silver Spring, MD (US); Elvin Peprah, Silver Spring, MD (US); David William Tarr, Silver Spring, MD (US)

(73) Assignee: Greenmo, Inc., Takoma Park, MD (US)

( * ) Notice: Subject to any disclaimer, the term of this patent is extended or adjusted under 35 U.S.C. 154(b) by 0 days.

(21) Appl. No.: 15/841,846

(22) Filed: Dec. 14, 2017

(65) Prior Publication Data

US 2019/0190559 A1 Jun. 20, 2019

(51) Int. Cl.
*H04B 1/3888* (2015.01)
*A45C 11/00* (2006.01)
*H04M 1/02* (2006.01)
*H04M 1/18* (2006.01)

(52) U.S. Cl.
CPC ............ *H04B 1/3888* (2013.01); *A45C 11/00* (2013.01); *H04M 1/0249* (2013.01); *H04M 1/185* (2013.01); *A45C 2011/002* (2013.01)

(58) Field of Classification Search
CPC ..... H04B 1/3888; H04B 1/3833; A45C 11/00; A45C 2011/002; H04M 1/0249; H04M 1/185; H05K 5/0013; H05K 5/0217; H05K 9/0037; H05K 9/0049
See application file for complete search history.

(56) References Cited

U.S. PATENT DOCUMENTS

| 6,490,438 B1* | 12/2002 | Wu ...................... H04B 1/3833 361/816 |
| 2013/0220841 A1* | 8/2013 | Yang ...................... A45C 11/00 206/37 |
| 2015/0062787 A1* | 3/2015 | Wilson .................. H04M 1/185 361/679.01 |

(Continued)

OTHER PUBLICATIONS

Nexpaq Smartphone Case, Christoff, 2016 https://www.tatacliq.com/que/upgrade-phone-useful-smartphone-case/ (Year: 2016).*

(Continued)

*Primary Examiner* — Jianxun Yang
(74) *Attorney, Agent, or Firm* — Harbin & Hein PLLC (57) ABSTRACT

A two-piece bumperband and clamshell assembly for protecting a smartphone subhousing. The bumperband comprise an impact resistant band of material that encircles peripheral edges of the subhousing. The bumperband includes an inwardly facing groove or channel structure that enables the bumperband to clamp against either or both a display screen bezel of the subhousing and the stepped ridge on the edges of the subhousing. The bumperband may also include a raised screen bumper protruding above and to protect the surface of the display screen. A downwardly protruding perimeter flange of the bumper band forms a perimeter gap to frictionally receive an upwardly protruding lip extending around the perimeter a clamshell backing when press-fitted with the subhousing and bumperband.

20 Claims, 12 Drawing Sheets

(56) References Cited

U.S. PATENT DOCUMENTS

2017/0026070 A1* 1/2017 Hodroj ................ H04B 1/3888

OTHER PUBLICATIONS

YouTube ultimate S7 edge case, Pazo, 2016 https://www.youtube.com/watch?v=N5SMaOj-QcA (Year: 2016).*
YouTube waterproof case, Mobile Fun, Jun. 2017 https://www.youtube.com/watch?v=rw4201mAuEk (Year: 2017).*
Samsung Galaxy S8 and S8+ specs, AndroidCentral, Mar. 2017 https://www.androidcentral.com/samsung-galaxy-s8-specs (Year: 2017).*

* cited by examiner

BUMPERBAND AND CLAMSHELL ASSEMBLY FOR PROTECTING A CELL PHONE SUBHOUSING

CROSS-REFERENCE TO RELATED APPLICATION

This invention claims the benefit of U.S. Provisional Application Ser. No. 62/436,131 filed Dec. 19, 2016 in the name of Neal Edward Holtz and entitled Screen Protector Bumper Ban to Couple Clamshell Backing Embodying Cell Phone Subhousing.

BACKGROUND

This invention pertains to protective coverings for a standard size hand-held digital device such as a smartphone.

Cellular smartphones and hand-held digital assistants have become ubiquitous throughout the world. Manufacturers typically produce subhousings that agglomerate internal components comprising a display screen, battery, audio speaker, sim card, microphone, circuit board, microprocessor, transceiver, antenna, memory, connectors, input-output couplings, switches, control buttons, etc. These subhousings are then assembled within a hard shell that is typically black or white before being sold to an end user. To render the device non-slip and/or to protect it from impact damage or scratches, end-users typically purchase a separate protective outer case or covering, which unfortunately increases the overall size and cost of the device. End-users also desire an aesthetically appealing protective covering or case. To meet this desire, retailers must also stock a variety of protective cases for a variety of expensive black or white smartphones.

The present invention, on the other hand, eliminates the need for the hard shell and outer protective case for the subhousing by combining functions of hard shell and protective case in a two-piece bumper band/clamshell assembly and, in addition, addresses the end-user's desire for both protection and aesthetics without expanding the overall size of the smartphone or hand-held digital device. In addition, by combining functions of a separate conventional protective case and a black/white hard shell, the present invention enables a larger volume for an internal battery without increasing the overall size (form factor) of the device as ultimately carried by the end user. Also, the invention enables a retailer or distributor to quickly and conveniently assemble at point-of-sale a customer's aesthetically desired smartphone without stocking a huge number of expensive black/white cell phones. Advantageously, retailers need only stock a limited number of expensive smartphone subhousings and a relatively large number and variety of inexpensive bumper bands and clamshell assemblies meeting the customer's widely varied demand for aesthetics.

SUMMARY

According to the present invention, there is provided an article of manufacturer comprising a two-piece bumperband/clamshell assembly for protecting a smartphone subhousing. Subhousing generally comprises a flat rectangular structure including a display screen having a surface and a bezel on a front surface thereof, a generally flat battery disposed on a portion of a rear of the subhousing, a stepped ridge extending around peripheral edges of the subhousing and a number of I/O switches and connections disposed at various locations about said peripheral edges. The first piece of inventive two-piece assembly comprises a band of material to encircle peripheral edges of the subhousing thereby forming a bumperband that protects the subhousing from impact forces. The bumperband has an inwardly facing trough, groove, track or channel structure that enables the bumperband to clamp against either or both the display screen bezel and the stepped ridge around peripheral edges of the subhousing, a raised screen bumper protruding above and to protect the surface of the display screen, and a downwardly protruding perimeter flange that forms a perimeter gap between the bumperband and the subhousing. The second piece of the two-piece assembly comprises a clamshell backing to cover the rear of the subhousing where the clamshell backing has an upwardly protruding lip extending around the perimeter thereof that is adapted to be frictionally coupled within the perimeter gap when press-fitted with the subhousing and bumperband. This way, there is provided an interconnected sealing relationship between and among the subhousing, bumperband and the clamshell.

Other features of the two-piece assembly may include surface treatment (e.g., etching, roughening, etc.) of surfaces within the perimeter gap to improve frictional coupling, wedging of the perimeter lip within the perimeter gap; forming a water-tight seal between and among the bumperband and clamshell backing; providing a raised screen bumper on the bumper band in the order of 0.5 mm more or less; providing a bumperband and clamshell material as a durable impact resistant, shock-absorbing, scratch-resistant, stiff material composed of plastic, metal, polyurethane, rubber, polymer or other material; providing stiffening pins inserted in legs of the bumperband; providing screws or other mechanical accommodations to enable physical attachment of the bumperband to the clamshell backing and/or the subhousing; providing a thumb tab formed on the bumperband to enable disassembly by peeling the bumperband away from the subhousing; and/or providing stiffening ribs limited to rectangular legs of the bumperband to permit pliability assisting of the bumperband during assembly and disassembly about the subhousing.

In accordance with another aspect of the invention, there is provided a two-piece bumper band and clamshell for protecting a subhousing of a portable digital device generally formed in a flat rectangular structure having a display screen on a first side thereof, a generally flat battery within the subhousing structure, a cross-sectionally contoured edge extending around periphery of the subhousing wherein the two-piece assembly comprises a bumper band comprising a band of material to extend around edges of said subhousing to protect the subhousing from impact forces, a complementary contoured groove to mate with said contoured edge of said subhousing, and a downwardly protruding perimeter flange that forms a perimeter gap between said bumper band and the subhousing, and a clamshell comprising an impact-resistant material including an upwardly protruding lip extending around the perimeter thereof and adapted to be press-fitted inside the perimeter gap formed by said subhousing and bumper band whereby to provide an interconnected sealing relationship between and among said subhousing, bumper band and said clamshell.

In accordance with yet another aspect of the invention, there is provided in combination with a smart phone subhousing that generally comprises a flat rectangular structure for housing components including at least one control switch, transmitter, receiver, status indicator, processor, memory, camera, flash unit for said camera, display driver, microphone, speaker, sim card slot, connector port for an external connector, interconnecting signal and/or power connectors for said components, display screen and bezel for holding the display screen in place; an improvement comprising a bumperband formed of a continuous band of impact-resistant material having formed therein a inwardly facing groove structure to couple both a bezel of the display screen and peripheral ridges of the subhousing thereby to hold the bumperband in place against the subhousing wherein the bumperband further includes a rearwardly extending flange that establishes a perimeter gap between the bumperband and subhousing, and a clamshell backing for the subhousing that includes a forwardly extending perimeter lip adapted to frictionally mate with downwardly extending flange of the bumperband when the lip is inserted into the perimeter gap when abutted against a rear side of the cell phone subhousing, wherein the clamshell backing comprises a durable impact resistant, shock-absorbing, non-slip, pliable and/or rigid material.

These and other aspects of the invention will become apparent upon review of the following description taken in connection with the accompanying drawings wherein like reference numeral refer to like elements. The invention, though, is pointed out with particularity by the appended claims.

BRIEF DESCRIPTION OF THE DRAWINGS

FIG. 1B also shows an eyelet 14 through which an input jack may connect with the smartphone.

DESCRIPTION OF ILLUSTRATIVE EMBODIMENTS

Although the illustrated embodiments shown herein describe an assembly for protecting a cell phone, the invention may be deployed with any portable digital assistant or hand-held digital device for which an end user desires protection without unduly increasing the overall size of the device. Moreover, the structures shown and described herein, based on the teachings provided by this disclosure, may be modified or adapted to each other in ways different from those illustrated without departing from the spirit and scope of the invention.

A principal aspect of the invention comprises an article of manufacture that provides a bumperband/clamshell assembly for encasing and protecting a smart phone subhousing as a replacement for the combination of a manufacturer's subhousing hard shell and an end-user's outer protective case or covering. At the same time, the invention also enables a retailer to assemble at point-of-sale protective coverings of a multitude of aesthetic designs per customer desires. The inventive assembly advantageously comprises a two-piece assembly that enables relatively quick assembly and disassembly using a variety of materials including polyurethanes, metals, glasses, injection-molded plastics, and other materials.

The bumperband includes a raised screen guard or protective ridge formed in the top side of structure and a peripheral flange protruding downwardly to mate with a complementary lip of a clamshell backing for a cellular phone subhousing. Mechanical coupling between the bumperband and clamshell backing may be accomplished by press-fitting within a perimeter cavity formed between the bumperband and the subhousing, a complementary interlocking edge configuration (e.g., raised barrier and a decent or mechanical stop), or by screws, pins, or other means for coupling between the bumperband and clamshell backing. In an illustrative embodiment, the bumper band includes one or more of the following features:

1. cutouts, raised buttons or other accommodations positioned in the band to allow operation of switches, ports, vents or other mechanisms/circuits associated with components of the cell phone that is embodied in the subhousing;
2. overhanging flange of the bumperband mates with a perimeter lip of the clamshell backing to permit manual press-fit assembly of bumperband and clamshell backing thereby enveloping the cell phone subhousing;
3. water-tight or leak-proof coupling seal configuration between bumperband and lip of clamshell backing to protect internal components of subhousing;
4. flat or planar surface portion of bumper band that lies against and seals a planar surface portion of the display screen of the cell phone subhousing;
5. bumperband includes preferably impact-resistant screen guard that, when assembled, is raised (preferably 0.5 mm more or less) relative to planar surface of display screen to serve as screen protector (material of bumper guard may be of same or different from material of bumper band);
6. bumperband comprised of a durable impact resistant, shock-absorbing, pliable, stiff and/or resilient material (such as a plastic, metal, rubber, polyurethane, polymer or other material);
7. preferably, the body of bumperband, edge of bumperband that interlocks with clamshell and the planar surface portion of bumper band that lies against the display screen of the subhousing are formed of a continuous unitary band of material;
8. a thumb tap on bumperband (not shown) to allow easy disassembly of bumperband by peeling the bumperband away from clamshell backing;
9. screws or other fastening means attaching bumperband to a perimeter lip of clamshell backing and/or directly screwing or attaching the bumperband to subhousing through the clamshell backing in order to strengthen assembly of entire assembly;
10. any one or more of mechanical or physical features shown or readily apparent from the drawing illustrations presented in this disclosure; or
11. stiffening ribs along the leg portions of the bumperband, which maintain flexibility at the corners to allow ease of assembly and disassembly of the bumperband against the cell phone subhousing.

The clamshell backing abuts a rear side of the subhousing and may include one or more of the following features:

1. cutouts for camera eyelet, speaker, and/or other components of cell phone;
2. multiple aesthetic patterns;
3. a durable impact resistant, shock-absorbing, non-slip, pliable and/or rigid material;
4. electro-magnetic and/or EMF radiation shielding; or
5. fire/heat resistance.

The shape or contour of the outer edges of clamshell and bumperband when assembled with the subhousing may be flat (e.g., straight), convex or other contoured configuration according to aesthetic desires of the end user. The subhousing is manufactured by a third-party manufacturer and is typically of a standard size or form factor. It comprises a generally flat form factor having a generally rectangular cross-section for containing cell phone components including at least one control switch, antenna, transmitter, receiver, status indicator LED, processor, memory, camera, flash unit for said camera, display screen, display driver, microphone, speaker, sim card slot, connector port for an external connector, and interconnecting signal and/or power connector for said components.

Figure 1A:
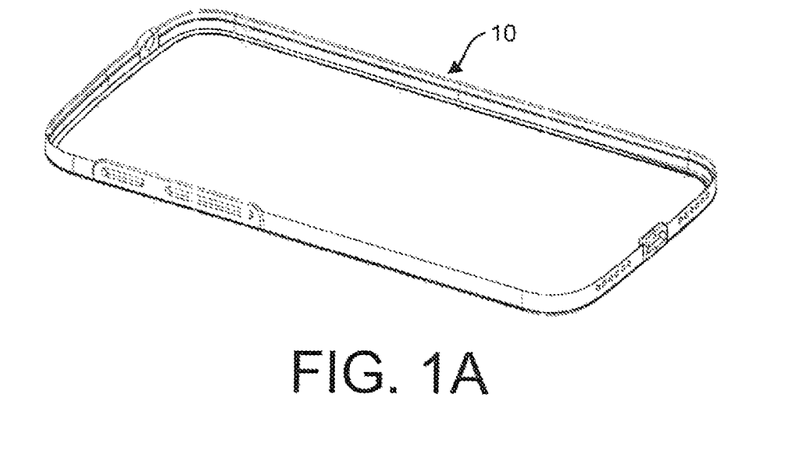
FIG. 1A is a perspective view of the bumperband according to the present invention. The bumperband may also include a thumb tab (not shown) to assist in disassembly.
Figure 1B:
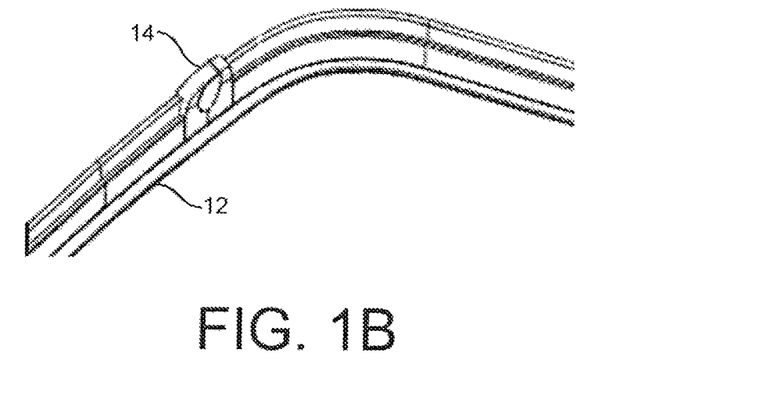
FIG. 1B depicts an enlarged portion of the bumper band of FIG. 1A that shows flange 12 on a bottom of bumper band 10 to mate with a complementary flange 52 of clamshell backing 50 (FIG. 7).
Figure 2A:
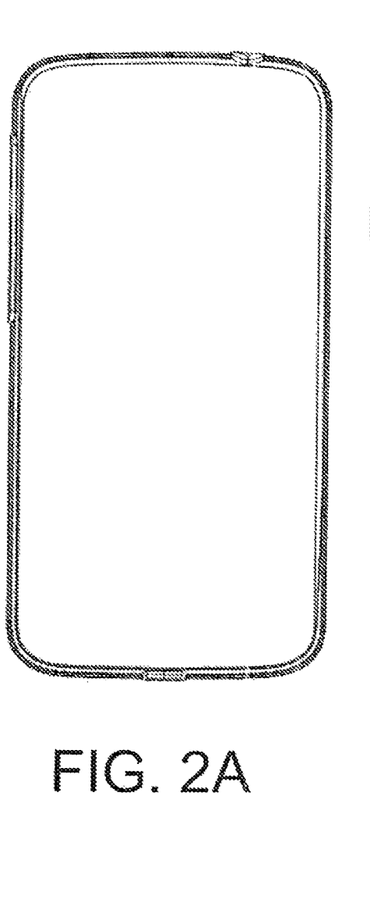
FIG. 2A depicts a top view of bumperband 10 of FIG. 1
Figure 2B:
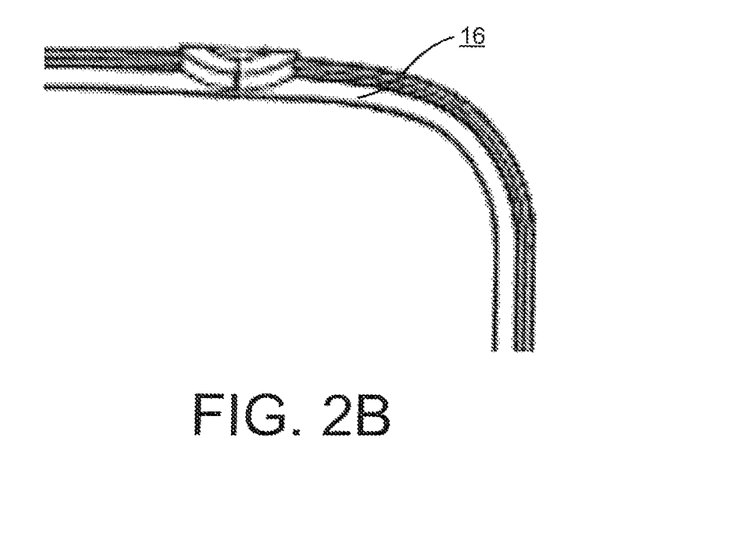
FIG. 2B shows an enlarged portion of FIG. 2A depicting in greater detail a planar flange 16 adapted to flush-mount with a planar surface of a display screen when assembled with a subhousing.
Figure 7:
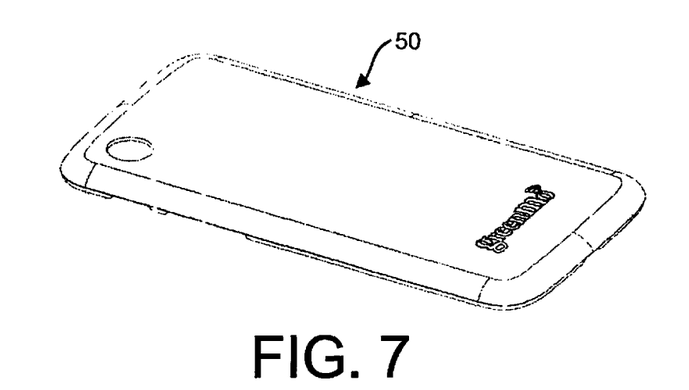
FIG. 7 is a perspective view of a clamshell backing according to the present invention.
Figure 18:
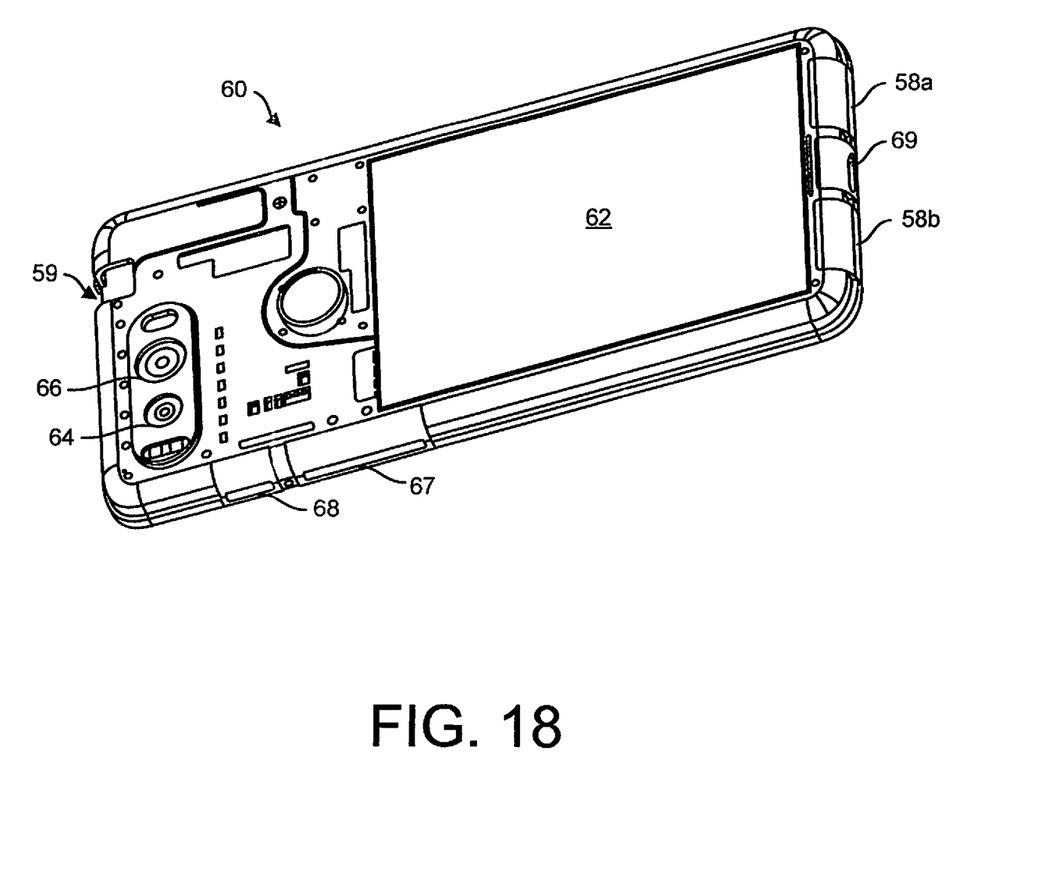
FIG. 18 depicts a perspective rear view of typical standard size subhousing comprising an agglomeration of subassemblies.

FIGS. 1A and 1B show respective perspective and top views of the bumper band 10 that may include a thumb tab to assist in disassembly when encircling a subhousing. In assembled relation, an overhanging flange 12 of bumperband 10 as shown in FIG. 1B forms a peripheral cavity between flange 12 and the sides of the subhousing into which a complementary lip of the clamshell is inserted. As shown, bumperband 10 also includes multiple cutouts or other physical attributes for switches, I/O jacks, etc. associated with functionality of the digital device. FIG. 1B depicts an enlarged portion of the bumperband of FIG. 1A that shows flange 12 on a bottom of bumperband 10 to mate with a complementary flange 52 of clamshell 50 (FIG. 7). FIG. 1B also shows an eyelet 14 through which an input jack may connect with the smartphone. FIG. 2B shows an enlarged portion of FIG. 2A depicting in greater detail a planar flange 16 adapted to flush-mount against a planar bezel surface of a display screen when assembled with subhousing (FIG. 18).

Figure 3:
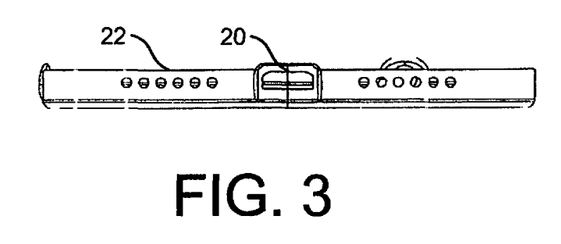
FIG. 3 depicts a bottom edge of the bumperband of FIG. 1A as well as an eyelet 20 for insertion of a data/charger input.
Figure 4:
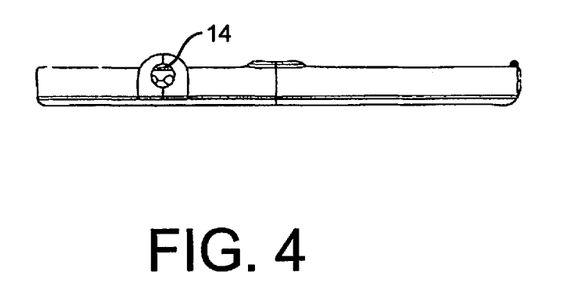
FIG. 4 depicts a top edge of the bumperband of FIG. 1A and an eyelet 14 enabling insertion of an input jack.
Figure 5:
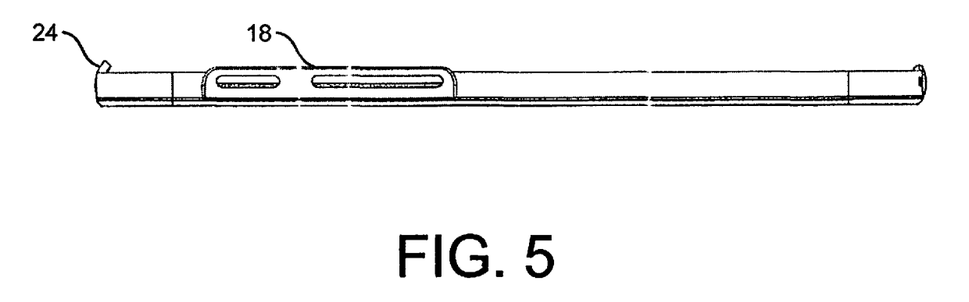
FIG. 5 depicts a first side edge of the bumperband of FIG. 1A as well as screen guard 24 that circumscribes an outer boundary of a planar surface of a display screen when fully assembled.
Figure 6:
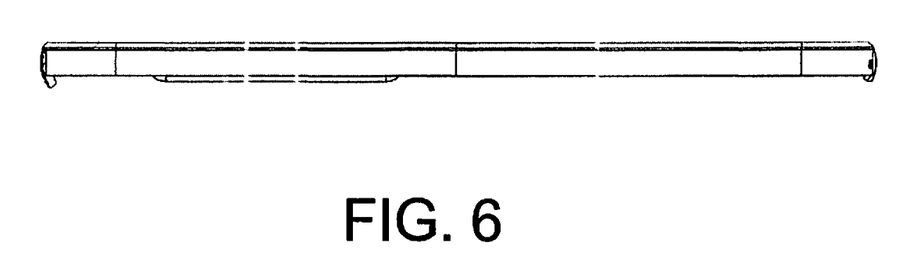
FIG. 6 depicts a second side edge of the bumperband of FIG. 1A.

FIG. 3 depicts a lower end view of the bumper band of FIG. 1A as well as an eyelet 20 for insertion of a data/charger input. FIG. 4 depicts an upper end view of the bumper band of FIG. 1A also depicting eyelet 14 for insertion of an input jack. FIG. 5 depicts a first side edge of the bumper band of FIG. 1A as well as screen guard 24 that circumscribes an outer boundary region, i.e., bezel, of a planar surface of a display screen when fully assembled. FIG. 6 depicts a second side edge of the bumper band of FIG. 1A.

Figure 8A:
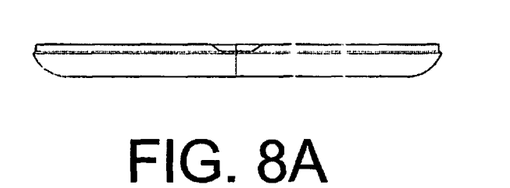
FIG. 8A shows a bottom edge of the clamshell backing of FIG. 7.
Figure 8B:
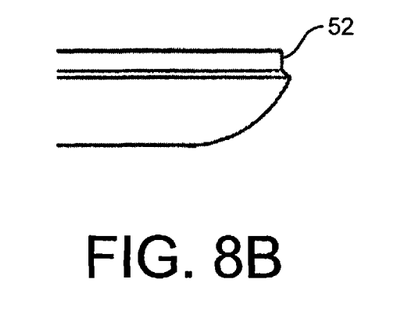
FIG. 8B shows an enlarged portion of the clamshell backing of FIG. 8A, which depicts in greater detail a perimeter flange 52 that mates with bumperband flange 12 of FIG. 1B. Mating flanges 12, 52 may also be adapted to employ screws or other fastening means (not shown) to reinforce coupling between them. Screws (Teflon or metal) may also be used to penetrate the subhousing in order to lock together the entire assembly.

FIG. 7 is a bottom perspective view of clamshell 50 according to the present invention. FIG. 8A shows a lower end of the clamshell backing of FIG. 7. FIG. 8B shows an enlarged portion of the clamshell 50 which shows in greater detail a protruding lip 52 that mates with bumperband flange 12 of FIG. 1B. When assembled, lip 52 is wedged in a cavity formed by an overhanging flange 12 of bumperband 10 and the sides of the subhousing. Mating flange 12 and lip 52 may also be adapted to employ screws or other fastening means to reinforce coupling between them. Screws (Teflon or metal) may also penetrate the subhousing in order to lock together the entire assembly.

Figure 9:
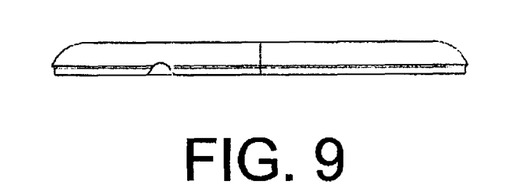
FIG. 9 shows a top edge of clamshell backing of FIG. 7.
Figure 10:
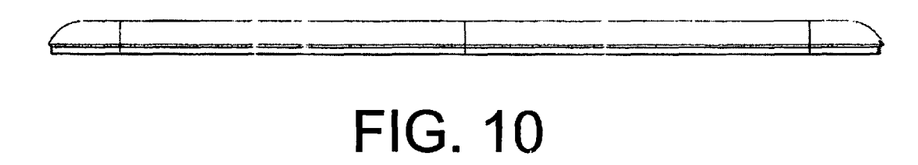
FIG. 10 shows a first side edge of the clamshell backing of FIG. 7.
Figure 11:
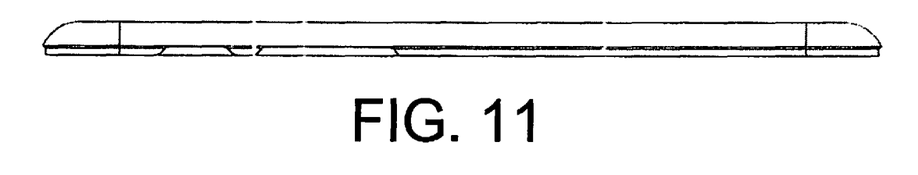
FIG. 11 shows a second side edge of the clamshell backing of FIG. 7.

FIG. 9 shows an upper end view of clamshell 50 of FIG. 7. FIG. 10 shows a first side edge of the clamshell backing of FIG. 7. FIG. 11 shows a second side edge of the clamshell backing of FIG. 7.

Figure 12:
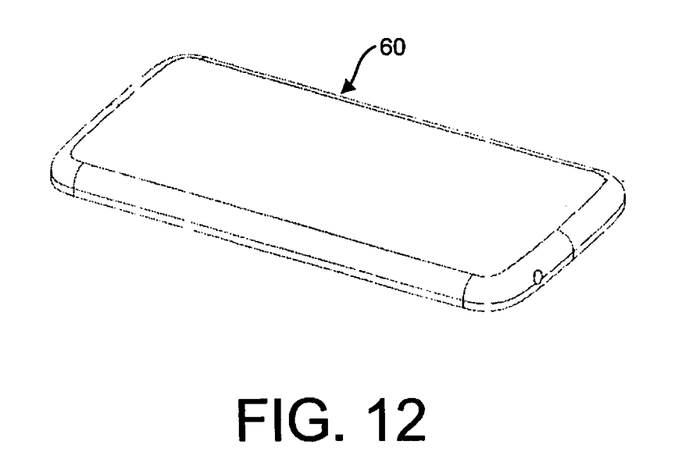
FIG. 12 depicts a typical smart phone subhousing that embodies a battery, sim card(s), display screen, and other internal and external components of the smart phone.
Figure 13:
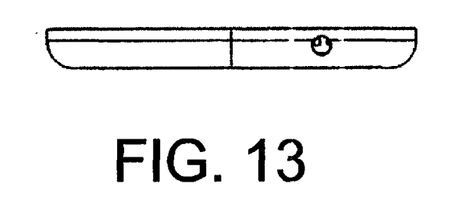
FIG. 13 shows a top edge of the subhoused components of FIG. 12.
Figure 14:
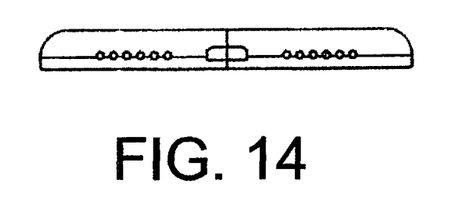
FIG. 14 shows a bottom edge of the subhoused components of FIG. 12.
Figure 15:
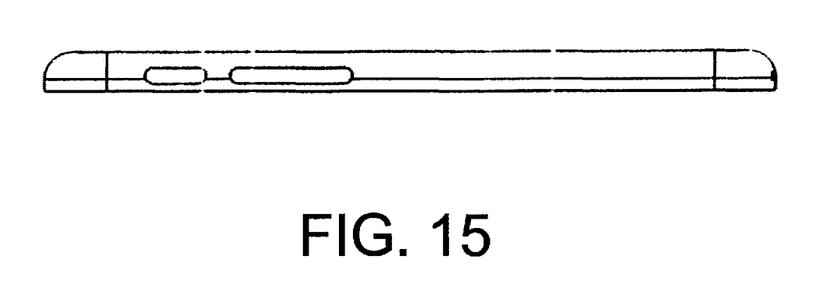
FIG. 15 shows a first side edge of the subhoused components of FIG. 12.
Figure 16:
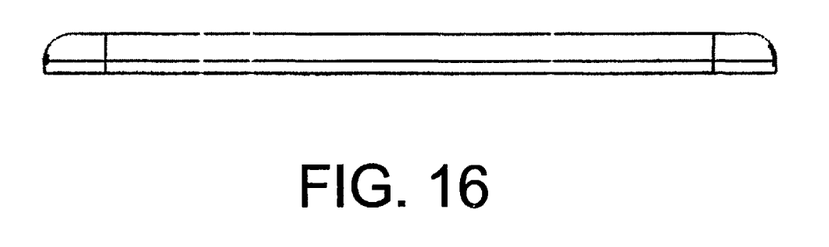
FIG. 16 shows a second side edge of the subhoused components of FIG. 12.

FIG. 12 shows a typical standard size smart phone subhousing that embodies a battery, sim card(s), display screen, and other internal and external components of the smart phone. FIG. 13 shows an upper end view of the subhoused components of FIG. 12. FIG. 14 shows a lower end of the subhoused components of FIG. 12. FIG. 15 shows a first side edge of the subhoused components of FIG. 12. FIG. 16 shows a second side edge of the subhoused components of FIG. 12.

Figure 17:
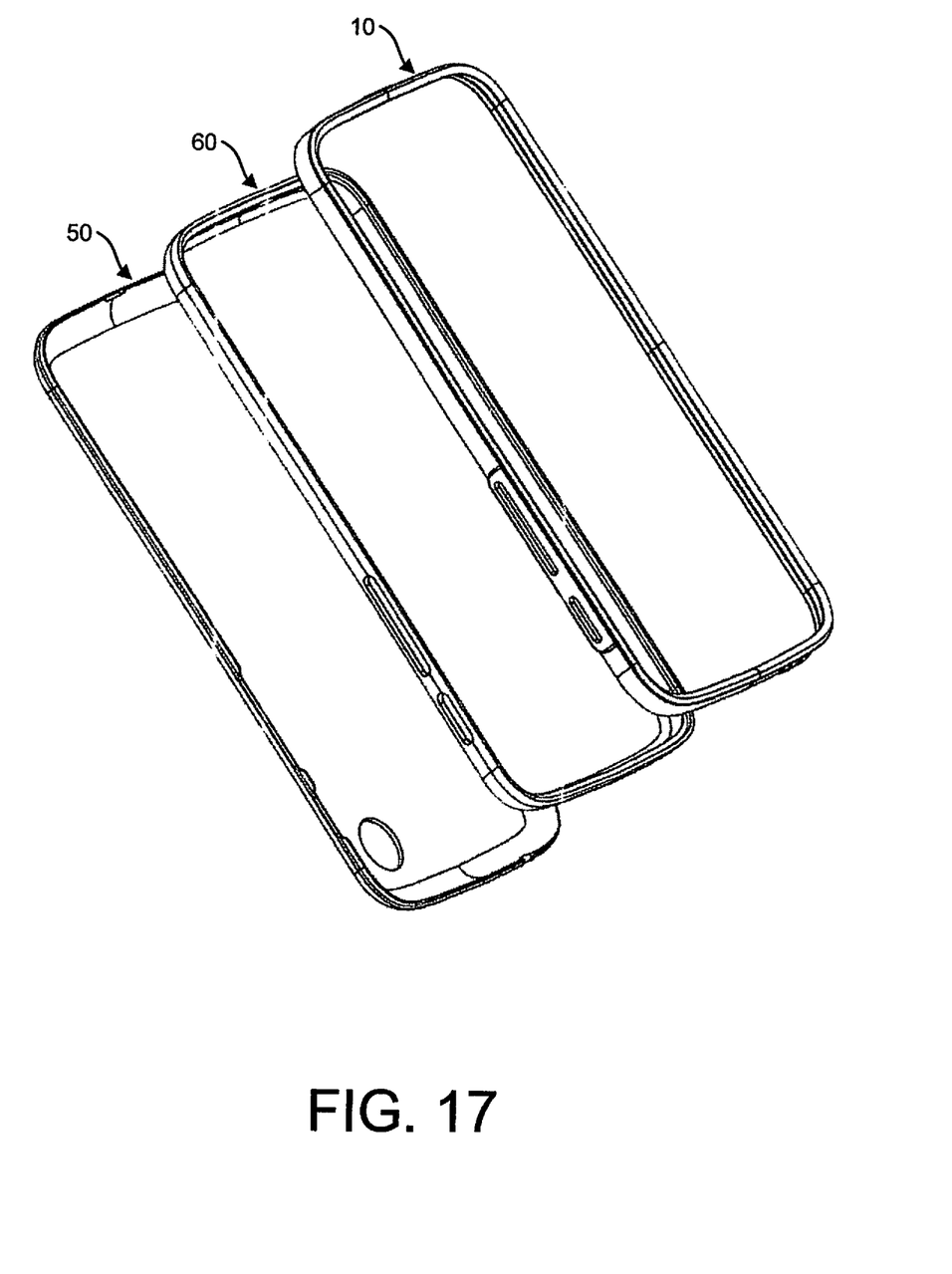
FIG. 17 shows clamshell backing 50, subhousing 60, and bumper band 10 in spaced-apart relation.

FIG. 17 shows clamshell 50, subhousing 60, and bumper band 10 in spaced-apart relation. Preferably, these components are press-fitted together at a point-of-sale which, according to an advantageous aspect of the present invention, enables the customer to select a desired smartphone design with inherent protective covering while, at the same time, avoids necessity of the retailer to stock fully assembled premanufactured smartphone comprising subhousings with built-on black or white hard shells. This way, for example, a retailer need only stock one or two different types of subhousings (e.g., with different functionalities) and yet be able to provide customers with a variety of aesthetic protective casings thereby saving the expense of a separate outer protective casing.

Figure 19:
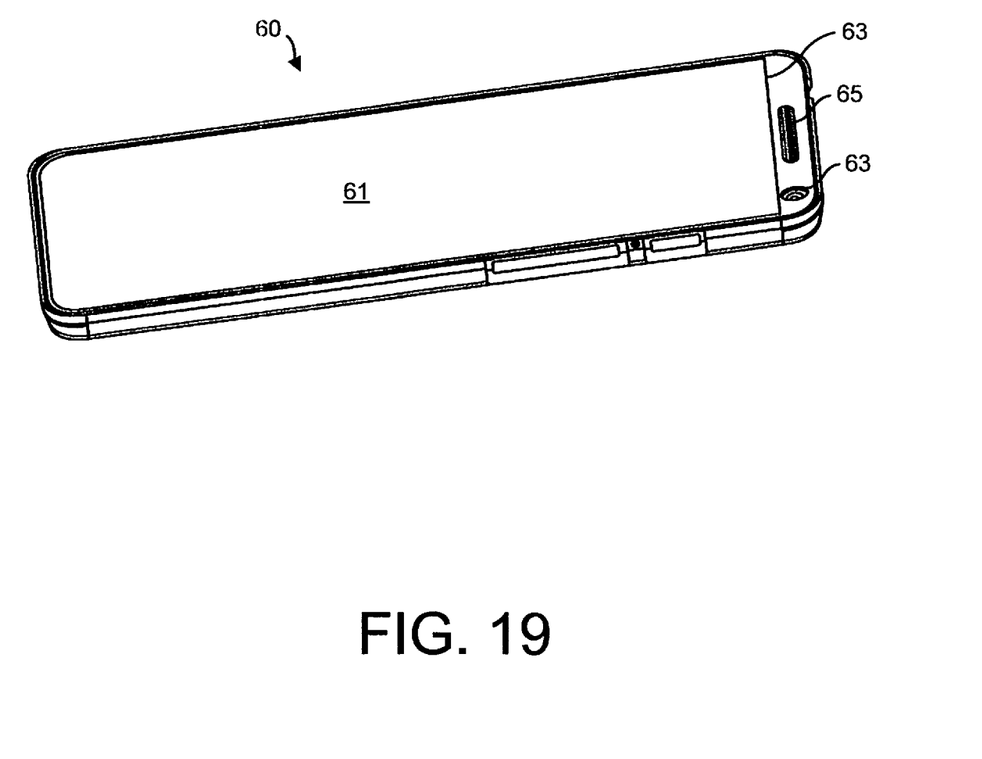
FIG. 19 depicts a perspective top view of typical subhousing showing a display screen.
Figure 20:
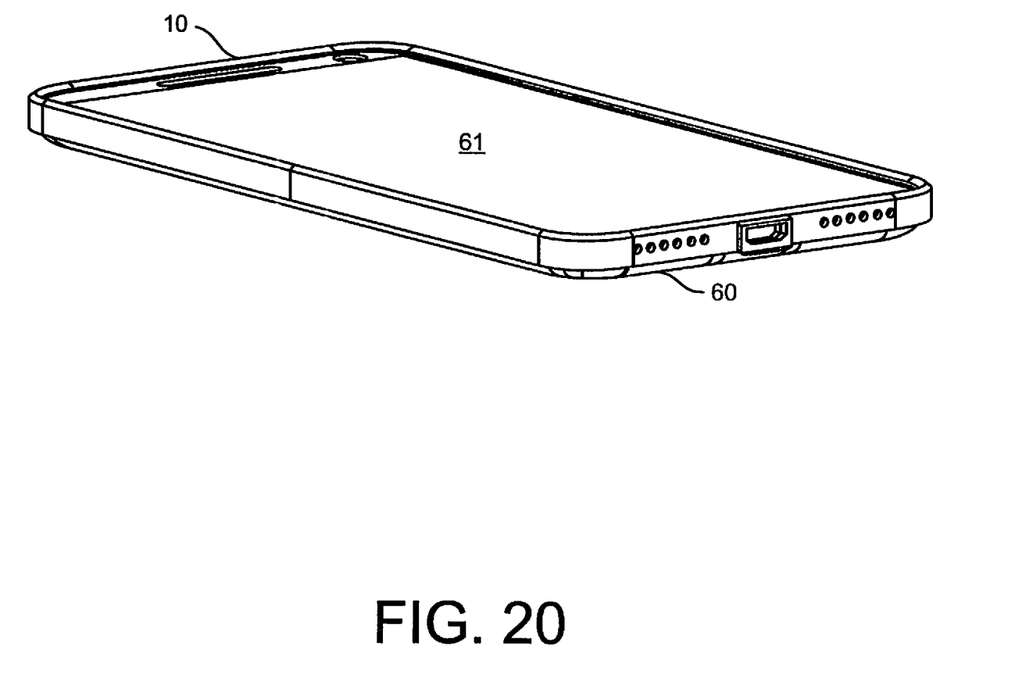
FIG. 20 is a perspective top view of the subhousing of FIG. 18 encircled by a bumperband in accordance with the present invention.

FIGS. 18 and 19 respectively show rear and front panels of a conventional standard size subhousing that embodies an agglomeration of subassemblies. The dashed line 63 indicate a structure for holding display screen in place and may comprise, for example, a grooved or slotted rim to received edges of display screen 61 where the rim is fastened to the subhousing by conventional means. The rim is thus slightly raised from the surface of the display screen. Such subhousings are available off-the-shelf from several manufacturers. As shown, the subhousing 60 includes a large display screen, lithium-ion battery 62, speaker 65, power switch 68, mini USB charging port 69 and microphone (not shown). Other common features include a main camera 64, flash unit 66, audio jack 59, speakers 58a-58b, and secondary camera 63. FIG. 20 is a perspective top view of the subhousing 60 of FIG. 18 encircled by bumperband 10. As explained herein, bumperband 10 has a complementary cross-sectional shape to fit flush with and/or clamp against corresponding ridges on the sides of subhousing 60 and/or the display screen rim/bezel structure 63. Bumperband 10 may also include stiffening elements or ribs on each leg of the rectangular structure, but not in the corners, so that band 10, although comprised of a relatively stiff hard scratch-proof material, may be somewhat pliable in the corners thereof as the bumper band is twisted and/or contorted while being forced onto subhousing 60. Since the present invention eliminates the manufacturer's hard shell, the assembled bumperband-clamshell-subhousing structure may accommodate a larger battery in the thin space vacated by the hard shell, and consequently, increased operational life of the digital device between battery charges. For durability, the material of both the clamshell and bumperband may comprise a rigid metals or other materials such as polyurethane, plastics. Due to thinness, the bumperband has a degree of flexibility to be easily assembled against the subhousing. The clamshell and bumperband may be formed of the same material, i.e., having same coefficients of expansion, in order to avoid/minimize effects of dislocation due to thermal expansion/contraction from temperature changes.

Figure 21:
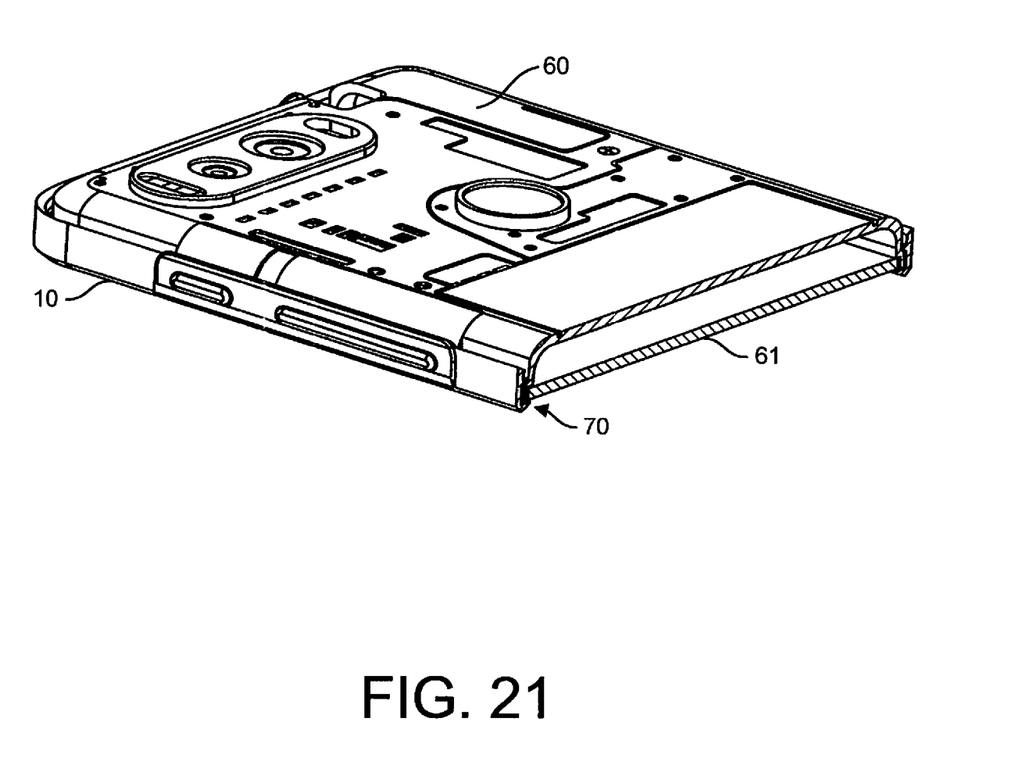
FIG. 21 is a cross-sectional cut of the bumperband and subhousing assembly of FIG. 20.
Figure 22:
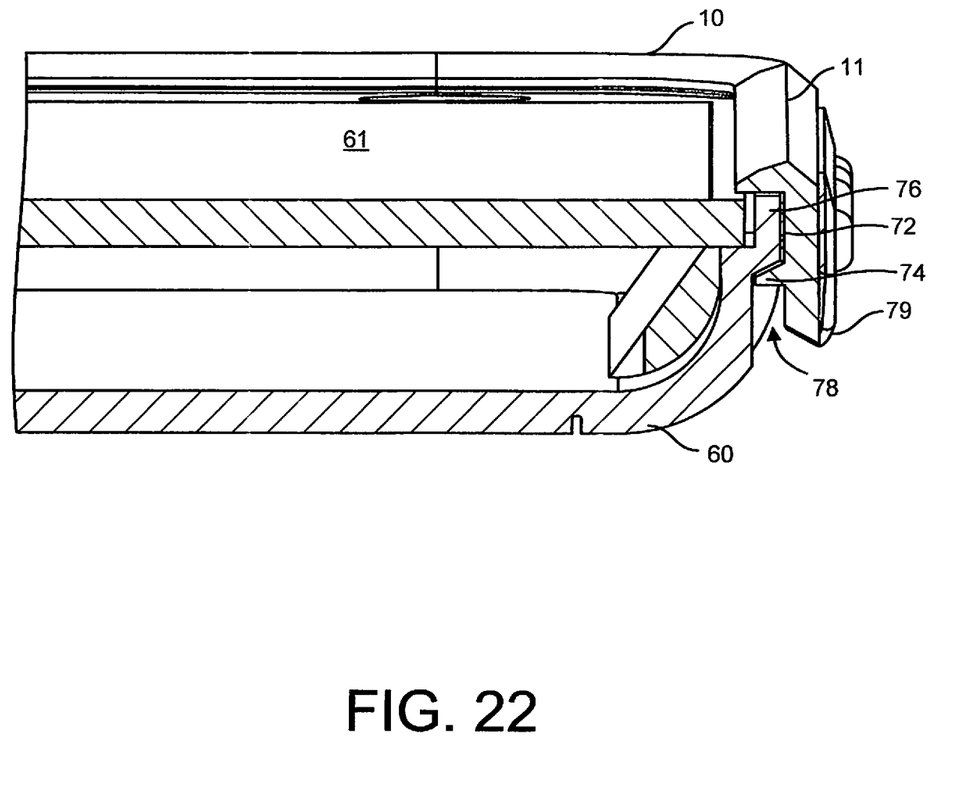
FIG. 22 depicts a top perspective view of a cross-sectional cut of a subhousing and bumperband assembly, which shows a perimeter gap or cavity formed by the subhousing and an overhanging flange of bumperband into which a perimeter lip of the clamshell is wedged when assembled together.
Figure 23:
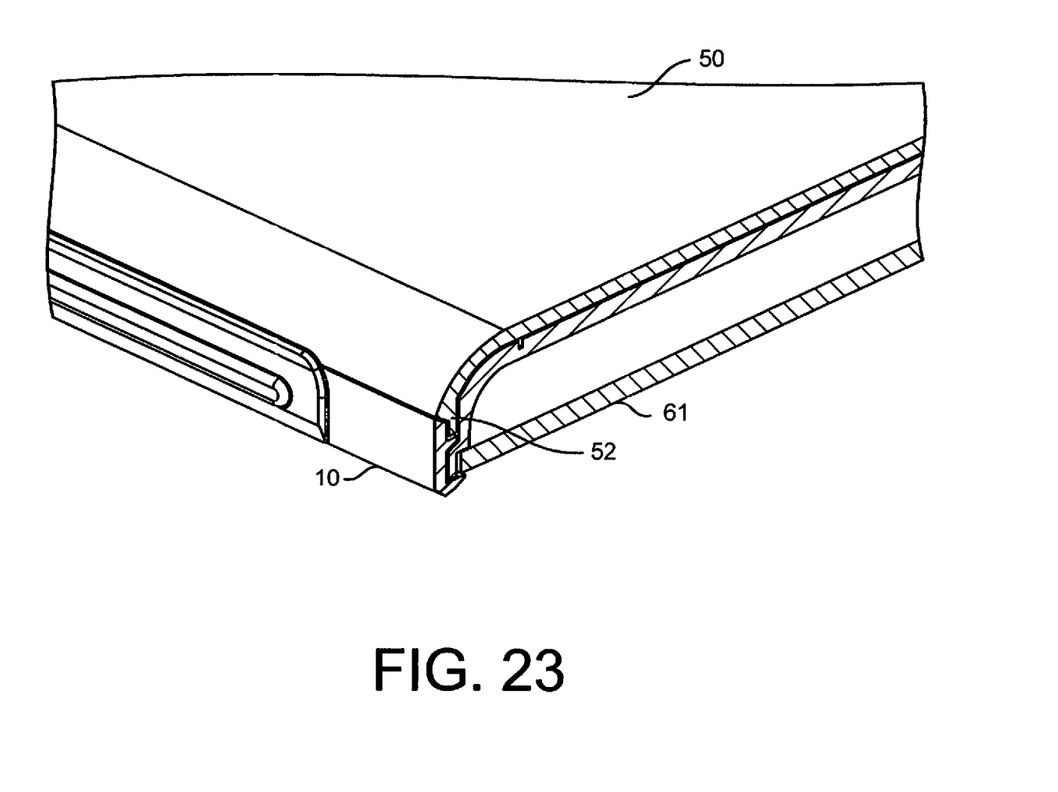
FIG. 23 is a perspective view of a cross-sectional cut showing the clamshell, bumperband and subhousing in assembled relation.

FIG. 21 is a cross-sectional cut of bumperband 10 and subhousing 60 provided to illustrate the complementary or interlocking relationship at the peripheral edge 70 of the subhousing. FIG. 22 shows that relationship in greater detail. As seen, bumperband 10 may include a groove 72 and lip 74 formed therein and extending along the interior in order to clamp against and interlock with a ridge 76 formed about the periphery of subhousing 60. Bumper band 10 may include a raised stiffening ridge 11 to serve as a screen bumper where the height of the raised stiffening ridge is about 0.5 mm, more or less, but adequate to purposely serve as a screen protector. The height or thickness of the stiffening ridge may be diminished at the corners to provide bumperband pliability, as previously explained. The structural arrangement also provides a gap 78 between overhanging flange 79 and sides of the subhousing. The extent of the overhang may be in the order of two to five millimeters, more or less. Importantly, gap 78 provides a space into which a perimeter lip of clamshell backing is wedged. FIG. 23 shows wedging or press-fitting of clamshell lip 52 into gap 78. The clamshell may conventionally include an antenna formed therein with surface contacts (typically comprised of noble metals) that mate with corresponding antenna contacts of the subhousing.

Figure 24:
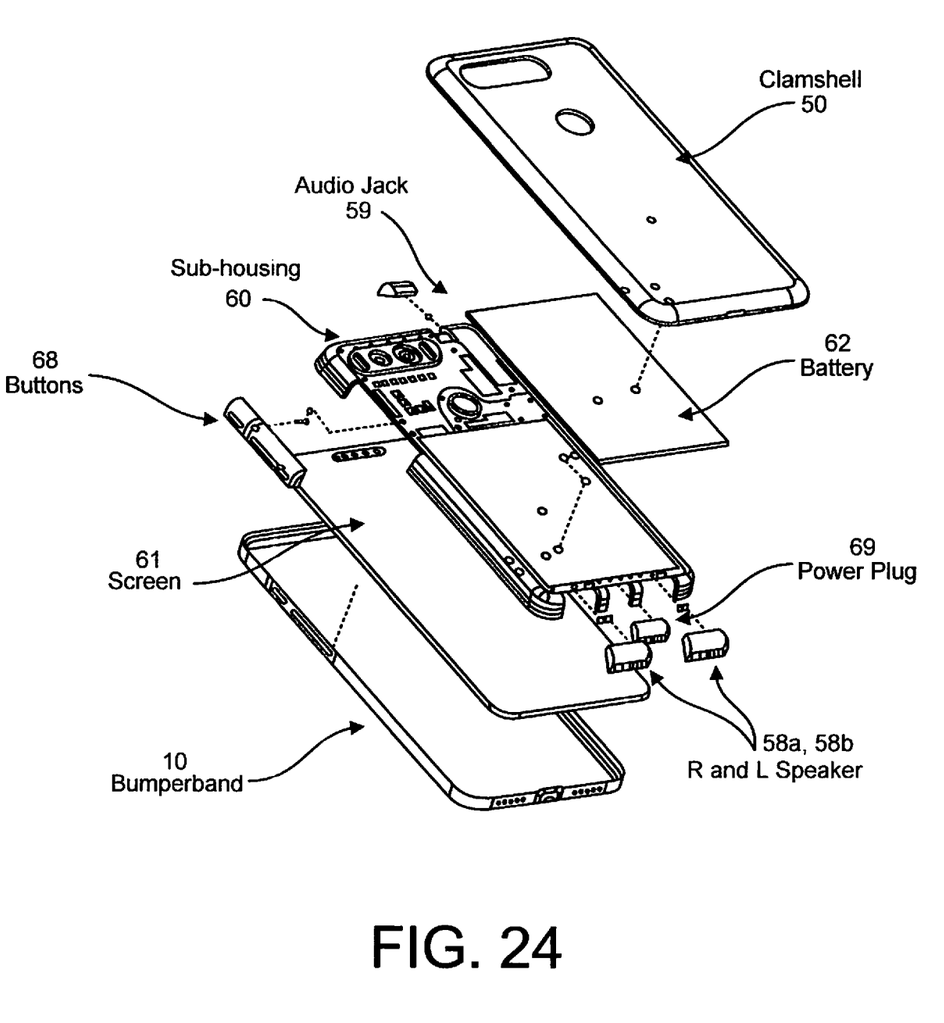
FIG. 24 is an exploded view of the spaced-apart relation among subhousing, bumperband and clamshell.

FIG. 24 is an exploded view of the spaced-apart relation among subhousing, bumper band and clamshell wherein like numerals indicate like components. According to the invention, the assembled structure may support a larger battery without increasing form factor volume, the wedging of the clamshell lip within space provided by overhanging bumper band flange establishes a water-tight seal, a raised screen protector ridge integrally formed with the bumper band provides protection for the display screen, and a series of thickening ribs or ridges in legs of the rectangular bumper band enables sufficient pliability to be twisted and/or contorted during installation.

The above description illustrates various embodiments that may be deployed to carry out the invention. Based on the teachings provided by the illustrated embodiments, derivations of the invention may be devised by those skilled in the art without departing from the true spirit and scope of the invention. As such, it is not the intent of the inventors to limit the scope of the invention to the illustrated embodiments but instead to extend the scope of the protected matter to those derivations, variations, modifications and adaptions as may become known to persons skilled in the art based on teachings provided by this disclosure. Thus, the invention is defined by the appended claims rather than the illustrated embodiments.

Accordingly, we claim:

1. A two-piece assembly for protecting a smartphone subhousing formed in a generally flat rectangular structure including a display screen having a surface and a bezel on a frontal surface thereof, a generally flat battery on a portion of a rear side of the subhousing, a stepped ridge extending around peripheral edges of the subhousing and a number of I/O switches and connections disposed at various locations about said peripheral edges, said two-piece assembly comprising:

a band of material to encircle peripheral edges of said subhousing thereby forming a bumperband that protects the subhousing from impact forces, said bumperband including an inwardly facing groove structure that enables the bumperband to clamp against both the bezel and the stepped ridge of said subhousing, a raised screen bumper protruding above and to protect the surface of said display screen, and a downwardly protruding perimeter flange that forms a perimeter gap having opposing parallel sidewalls between said bumper band and the subhousing, and a clamshell backing to cover the rear of said subhousing, said clamshell backing including an upwardly protruding lip having parallel sidewalls substantially complementary to the parallel sidewalls of said perimeter gap and adapted to be frictionally coupled substantially inside said perimeter gap between the subhousing and bumperband when press-fitted with the subhousing and bumperband whereby the perimeter gap and upwardly protruding lip establish a three-part frictionally coupled interconnected sealing relationship between and among said subhousing, bumperband and clamshell backing.

2. The two-piece assembly of claim 1, wherein said inner groove structure of the bumperband and perimeter lip of said clamshell backing are surface treated to improve frictional coupling therebetween.

3. The two-piece assembly of claim 1, wherein the lip of the clamshell backing is wedged between the subhousing and the bumperband and forms a water-tight seal when the upwardly protruding lip thereof is frictionally wedged inside said perimeter gap.

4. The two-piece assembly of claim 1, wherein said screen bumper is raised 0.5 mm more or less above the surface of the display screen when assembled with the subhousing.

5. The two-piece assembly of claim 1, wherein said bumperband and clamshell backing comprise a durable impact resistant, shock-absorbing, scratch-resistant, stiff material composed of plastic, metal, polyurethane, rubber, polymer or other material.

6. The two-piece assembly of claim 1, further including stiffening pins coextensive with portions of each of the legs of the bumperband to enable a degree of pliability at corners of the bumperband during twisting and/or contortion thereof while being fitted onto the subhousing.

7. The two-piece assembly of claim 1, further including screw holes or other mechanical accommodations in a sidewall thereof to enable physical attachment of the bumperband to the clamshell backing and/or said subhousing.

8. The two-piece assembly of claim 1, further including a thumb tab formed on the bumperband to enable disassembly by peeling the bumperband away from the subhousing.

9. The two-piece assembly of claim 1, wherein the bumper band includes stiffening ribs limited to rectangular legs thereof to permit pliability of the bumperband during assembly and disassembly about said subhousing.

10. A two-piece bumperband and clamshell for protecting a subhousing of a portable digital device generally formed in a flat rectangular structure having a display screen on a first side thereof, a generally flat battery within the subhousing structure on a second side thereof, and a cross-sectionally contoured peripheral edge extending around periphery of the subhousing:

said bumperband comprising a band of material that extends around peripheral edges of said subhousing to protect the subhousing from impact forces, a complementary cross-sectionally contoured inwardly facing groove to mate with the contoured edge of said subhousing, and a downwardly protruding perimeter flange that forms a perimeter gap between said bumperband and the subhousing wherein the perimeter gap forms substantially parallel sidewalls between said subhousing and said bumperband, and said clamshell comprising an impact-resistant material including an upwardly protruding lip having parallel sidewalls substantially complementary to the parallel sidewalls of said perimeter gap and adapted to be press-fitted substantially inside the perimeter gap whereby the perimeter gap and upwardly protruding lip provide a three-part frictionally coupled interconnected sealing relationship between and among said subhousing, bumperband and clamshell.

11. The invention of claim 10, wherein said bumperband has legs and include a stiffening element in each leg.

12. The invention of claim 10, wherein said bumperband includes a raised screen bumper having a height between 0.5 mm and 1.0 mm, more or less, above said display screen.

13. The invention of claim 10, wherein overlap between said flange and lip is between 2 mm and 5 mm, more or less.

14. The invention of claim 10, wherein said contoured edge of said subhousing comprises a ridge or groove and said bumperband has a complementary contoured channel or groove to mate with the contoured edge of said subhousing.

15. In combination with a smart phone subhousing that generally comprises a flat rectangular structure for housing components including at least one control switch, transmitter, receiver, status indicator, processor, memory, camera, flash unit for said camera, display driver, microphone, speaker, sim card slot, connector port for an external connector, interconnecting signal and/or power port for said components, display screen and bezel, wherein the improvement comprises:

a bumperband comprising a continuous band of an impact-resistant material having formed therein a inwardly facing groove structure to couple both a bezel of said display screen and peripheral ridges of said subhousing thereby to fixedly place the bumperband against said subhousing, said bumperband further including a rearwardly extending perimeter flange that provides a perimeter gap between said bumper band and said subhousing, said perimeter gap forming opposing and substantially parallel sidewalls between said subhousing and said bumperband; and a clamshell backing for said subhousing that includes a forwardly extending perimeter lip having substantially parallel sidewalls complementary to the parallel sidewalls of said perimeter gap and being adapted to frictionally mate with said rearwardly extending flange and said subhousing when inserted into said perimeter gap while abutted against a rear side of the subhousing, said clamshell backing comprising a durable impact resistant, shock-absorbing, non-slip, pliable and/or rigid material whereby the perimeter gap and forwardly extending lip establish a three-part frictionally coupled interconnected sealing relationship between and among said subhousing, bumperband and clamshell.

16. The improvement as recited in claim 15, wherein said clamshell backing additionally includes electro-magnetic radiation shielding.

17. The improvement as recited in claim 15, wherein the perimeter flange of the bumper band overlaps with said perimeter lip to the extent of approximately 2 mm to approximately 5 mm.

18. The improvement as recited in claim 15, wherein surfaces of said perimeter lip and said perimeter flange are treated to improve frictional coupling therebetween when press-fitted together.

19. The improvement as recited in claim 15, wherein said bumperband includes a stiffening element in each leg of the bumper band.

20. The improvement as recited in claim 15, wherein said bumperband includes a screen bumper to protect a surface of a display screen of said subhousing.

* * * * *